United States Patent
Ye et al.

(10) Patent No.: US 11,856,424 B2
(45) Date of Patent: Dec. 26, 2023

(54) METHOD FOR CREATING NETWORK SIMULATION PLATFORM, NETWORK SIMULATION METHOD, AND CORRESPONDING APPARATUSES

(71) Applicant: HUAWEI TECHNOLOGIES CO., LTD., Shenzhen (CN)

(72) Inventors: Guojun Ye, Chengdu (CN); Bo Cheng, Shanghai (CN); Xi Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 17/345,273

(22) Filed: Jun. 11, 2021

(65) Prior Publication Data

US 2021/0306881 A1 Sep. 30, 2021

Related U.S. Application Data

(63) Continuation of application No. PCT/CN2020/091813, filed on May 22, 2020.

(30) Foreign Application Priority Data

May 22, 2019 (CN) .......................... 201910430994.3

(51) Int. Cl.
*H04W 16/22* (2009.01)
*H04W 24/06* (2009.01)
(Continued)

(52) U.S. Cl.
CPC .............. *H04W 24/06* (2013.01); *G06N 3/04* (2013.01); *G06N 3/08* (2013.01); *H04L 41/145* (2013.01); *H04W 16/22* (2013.01)

(58) Field of Classification Search
CPC .............................. H04W 24/06; H04W 16/22
See application file for complete search history.

(56) References Cited

U.S. PATENT DOCUMENTS 9,439,081 B1 * 9/2016 Knebl ..................... G06N 20/00
10,477,426 B1 * 11/2019 Tiwari ................ H04L 43/0852
(Continued)

FOREIGN PATENT DOCUMENTS

| CA | 2977300 A1 | 2/2019 |
|----|------------|--------|
| CN | 101237395 A | 8/2008 |

(Continued)

*Primary Examiner* — Michael T Vu
(74) *Attorney, Agent, or Firm* — Maier & Maier, PLLC

(57) ABSTRACT

A method for creating a network simulation platform that has a first black box model, includes: obtaining a candidate network performance indicator and feature information related to the candidate network performance indicator, where the feature information related to the candidate network performance indicator refers to a part or all of feature information needed to obtain the candidate network performance indicator; and training a machine learning model to obtain the first black box model, where an output parameter of the first black box model is the candidate network performance indicator, input parameters of the first black box model are the feature information related to the candidate network performance indicator, and the first black box model is used to simulate the candidate network performance indicator. The solutions provided help reduce simulation complexity and are applicable to large-scale network simulation.

20 Claims, 9 Drawing Sheets

(51) Int. Cl.
   *G06N 3/04* (2023.01)
   *G06N 3/08* (2023.01)
   *H04L 41/14* (2022.01)

(56) References Cited

U.S. PATENT DOCUMENTS

2018/0309641 A1   10/2018  Wang et al.
2020/0327449 A1*  10/2020  Tiwari ............... G06Q 30/0202

FOREIGN PATENT DOCUMENTS

| CN | 105491599 A | 4/2016 |
| CN | 105553584 A | 5/2016 |
| CN | 105634787 A | 6/2016 |
| CN | 106961122 A | 7/2017 |
| CN | 103747455 B | 3/2018 |
| CN | 108234198 A | 6/2018 |
| CN | 108365903 A | 8/2018 |
| CN | 108512621 A | 9/2018 |
| CN | 108564241 A | 9/2018 |
| CN | 109217955 A | 1/2019 |

\* cited by examiner

METHOD FOR CREATING NETWORK SIMULATION PLATFORM, NETWORK SIMULATION METHOD, AND CORRESPONDING APPARATUSES

CROSS-REFERENCE TO RELATED APPLICATIONS

This disclosure is a continuation of International Application No. PCT/CN2020/091813, filed on May 22, 2020, which claims priority to Chinese Patent Application No. 201910430994.3, filed on May 22, 2019. The disclosures of the aforementioned applications are hereby incorporated by reference in their entireties.

TECHNICAL FIELD

The embodiments relate to the field of simulation technologies, and in particular, to a method for creating a network simulation platform, a network simulation method, and apparatuses.

BACKGROUND

Research and development of a radio communications technology largely depends on simulation technologies. Radio communications simulation technologies may be divided into link simulation, system simulation, and network simulation. The link simulation is channel-level simulation (such as physical channel coverage and capacity simulation), the system simulation is base station-level simulation (such as a protocol procedure and scheduling simulation), and the network simulation is network-level simulation (such as network coverage and capacity simulation). Therefore, the network simulation has a relatively large simulation scale, and is usually simulation at a level with thousands or even tens of thousands of base stations.

Conventional network simulation is implemented by static snapshots, and cannot effectively reflect a time-varying feature in a radio network. However, a 5G communications system has a relatively high frequency, a relatively narrow beam, and is more sensitive to an environmental change. Therefore, the conventional network simulation is not applicable to the 5G communications system.

Although conventional system simulation can implement dynamic simulation and enable a system simulation technology to be applied to the network simulation, a message exchange mechanism of a network element needs to be simulated in the conventional system simulation. Consequently, a calculation amount is large during a simulation process, and a simulation result cannot be quickly obtained. In particular, when the system simulation technology is applied to the network simulation, a time required for the simulation at the level with thousands or even tens of thousands of base stations is unacceptable.

A conventional link simulation technology cannot be applied to the network simulation.

In summary, a conventional radio communications simulation technology cannot be effectively applied to network simulation of the 5G communications system. Therefore, a new network simulation technology needs to be proposed urgently.

SUMMARY

Embodiments provide a method for creating a network simulation platform, a network simulation method, and corresponding apparatuses, which can be applied to network simulation of a 5G communications system.

According to a first aspect, an embodiment provides a method for creating a network simulation platform, where the network simulation platform includes at least one black box model, and the at least one black box model includes a first black box model. The method includes: first, obtaining a candidate network performance indicator and feature information related to the candidate network performance indicator; and training a machine learning model to obtain the first black box model. An output parameter of the first black box model is the candidate network performance indicator, and input parameters of the first black box model are the feature information related to the candidate network performance indicator. The first black box model is used to simulate the candidate network performance indicator. Optionally, the candidate network performance indicator includes: a network performance indicator in a core network, a network performance indicator in a bearing network, a network performance indicator in an access network, or a cross-network network performance indicator. The cross-network network performance indicator refers to a network performance indicator affected by at least two networks among a core network, a bearing network, and an access network.

It may be understood that, based on the method provided in the first aspect, a black box model used to simulate one or more candidate network performance indicators in a core network, a bearing network, and/or an access network can be created. Input parameters and an output parameter (namely, input interfaces and an output interface) are defined for each black box model. In this case, it may be considered that the network simulation platform has been created. In the network simulation platform, the candidate network performance indicator and input feature information related to the candidate network performance indicator are mainly concerned, and a protocol procedure in an actual network does not need to be simulated. Therefore, the network simulation platform has relatively low complexity, and is applicable to large-scale network simulation.

Optionally, the feature information related to the candidate network performance indicator refers to a part or all of feature information needed to obtain the candidate network performance indicator.

In a possible implementation, the at least one black box model further includes a second black box model. An output parameter of the second black box model is one of the input parameters of the first black box model. That is, the embodiment supports a solution in which an output parameter of a black box model is used as an input parameter of another black box model (that is, there is an association relationship between the black box models). This optional solution provides a theoretical basis for "cascading a plurality of black box models during a simulation process to simulate a network performance indicator", and provides a theoretical basis for implementing end-to-end simulation.

In a possible implementation, the output parameter of the first black box model is a network performance indicator in a first network, and the output parameter of the second black box model is a network performance indicator in a second network. The first network is a core network, a bearing network, or an access network. The second network is any network other than the first network among the core network, the bearing network, and the access network. That is, the embodiment supports simulation of the cross-network network performance indicator, that is, supports end-to-end simulation. In other words, a model in an access network portion, a model in a bearing network portion, and a model in a core network portion may collaboratively complete simulation of a network performance indicator.

In a possible implementation, the method further includes: obtaining training data. The training data comes from an actual network or another simulation platform other than the simulation platform provided in the embodiment. In this case, the training a machine learning model to obtain the first black box model may include: training the machine learning model based on the training data to obtain the first black box model. It may be understood that, if the training data comes from an actual network, the training data helps improve simulation accuracy.

In a possible implementation, the machine learning model includes a neural network model.

In a possible implementation, the candidate network performance indicator includes a rank (rank), and feature information related to the rank includes a channel matrix.

In a possible implementation, the candidate network performance indicator includes a channel matrix, and feature information related to the channel matrix includes a multi-path parameter and an antenna configuration parameter.

In a possible implementation, the candidate network performance indicator includes a multi-path parameter, and feature information related to the multi-path parameter includes at least one of an electronic map, an engineering parameter, and a clutter type.

In a possible implementation, the candidate network performance indicator includes a channel state probability distribution parameter of a cell, and feature information related to the channel state probability distribution parameter of the cell includes a grid channel matrix of the cell and a channel state holding time sequence of the cell.

In a possible implementation, the candidate network performance indicator includes a precoding matrix of a cell, and feature information related to the precoding matrix of the cell includes a grid channel matrix of the cell.

In a possible implementation, in a simulation stage, a black box model may be used to replace a message queue processing process in a conventional network simulation platform. For example, a black box model may be used to replace a network element in a conventional network simulation platform, or may be used to replace a functional module (such as a channel model, a scheduling model, or a transmission model) in a network element. Optionally, after a black box model is used to replace a network element or a functional module in a conventional network simulation platform, data may be exchanged between the black box model and the conventional network simulation platform. That is, the black box model provided in the embodiment may be compatible with a conventional network simulation platform.

According to a second aspect, an embodiment provides a network simulation method, which is applied to a network simulation platform that includes at least two black box models. Optionally, the simulation platform may be a simulation platform created based on the foregoing first aspect or any possible implementation of the first aspect. The method includes: first, determining a first to-be-simulated network performance indicator; searching, from the at least two black box models, for a first black box model used to simulate the first to-be-simulated network performance indicator, where an output parameter of the first black box model is the first to-be-simulated network performance indicator; and inputting values of input parameters of the first black box model into the first black box model to obtain a value of the output parameter of the first black box model, and using the obtained value as a simulation result of the first to-be-simulated network performance indicator.

It may be understood that simulation may be directly performed on a to-be-simulated network performance parameter in this solution. Compared with a solution in a conventional technology, in which simulation is indirectly performed on a to-be-simulated network performance parameter by simulating a message processing procedure, this solution helps improve simulation efficiency.

In a possible implementation, the first to-be-simulated network performance indicator includes: a network performance indicator in a core network, a network performance indicator in a bearing network, a network performance indicator in an access network, or a cross-network network performance indicator.

In a possible implementation, the method further includes: searching, from the at least two black box models, for a second black box model used to simulate a second to-be-simulated network performance indicator, where an output parameter of the second black box model is one of the input parameters of the first black box model; and inputting values of input parameters of the second black box model into the second black box model to obtain a value of the output parameter of the second black box model, and using the obtained value as a simulation result of the second to-be-simulated network performance indicator. Based on this, the inputting values of input parameters of the first black box model into the first black box model includes: inputting the simulation result of the second to-be-simulated network performance indicator into the first black box model. That is, the embodiment supports cascading between black box models, so as to simulate a network performance indicator.

In a possible implementation, the output parameter of the first black box model is a network performance indicator in a first network, and the output parameter of the second black box model is a network performance indicator in a second network. The first network is a core network, a bearing network, or an access network; and the second network is any network other than the first network among the core network, the bearing network, and the access network. That is, the embodiment supports simulation of the cross-network network performance indicator, that is, supports end-to-end simulation. In other words, a model in an access network portion, a model in a bearing network portion, and a model in a core network portion may collaboratively complete simulation of a network performance indicator.

In a possible implementation, the first to-be-simulated candidate network performance indicator includes a rank, and feature information related to the rank includes a channel matrix.

In a possible implementation, the first to-be-simulated network performance indicator includes a channel matrix, and the output parameter of the first black box model includes a multi-path parameter and an antenna configuration parameter.

In a possible implementation, the first to-be-simulated network performance indicator includes a multi-path parameter, and the output parameter of the first black box model includes an electronic map, an engineering parameter, and a clutter.

In a possible implementation, the first to-be-simulated network performance indicator includes a channel state probability distribution parameter of a cell, and the output parameter of the first black box model includes a grid channel matrix of the cell and a channel state holding time sequence of the cell.

In a possible implementation, the first to-be-simulated network performance indicator includes a precoding matrix of a cell, and the output parameter of the first black box model includes a grid channel matrix of the cell.

According to a third aspect, an embodiment provides an apparatus for creating a network simulation platform, and the apparatus may be configured to perform any method provided in the foregoing first aspect or any possible implementation of the first aspect. The apparatus may be a server or a chip.

In a possible implementation, the apparatus may be divided into functional modules based on the method provided in the foregoing first aspect or any possible implementation of the first aspect. For example, each functional module may be obtained through division corresponding to each function, or two or more functions may be integrated into one processing module.

In a possible implementation, the apparatus may include a memory and a processor. The memory is configured to store a computer program. The processor is configured to invoke the computer program to perform the method provided in the foregoing first aspect or any possible implementation of the first aspect.

According to a fourth aspect, an embodiment provides a network simulation apparatus, and the apparatus may be configured to perform any method provided in the foregoing second aspect or any possible implementation of the second aspect. The apparatus may be a server or a chip.

In a possible implementation, the apparatus may be divided into functional modules based on the method provided in the foregoing second aspect or any possible implementation of the second aspect. For example, each functional module may be obtained through division corresponding to each function, or two or more functions may be integrated into one processing module.

In a possible implementation, the apparatus may include a memory and a processor, and the memory is configured to store a computer program. The processor is configured to invoke the computer program to perform the method provided in the foregoing second aspect or any possible implementation of the second aspect.

According to a fifth aspect, an embodiment provides a computer-readable storage medium, such as a non-transient computer-readable storage medium, where a computer program (or an instruction) is stored in the computer-readable storage medium, and when the computer program (or the instruction) is run on a computer, the computer is enabled to perform any method provided in the foregoing first aspect or any possible implementation of the first aspect.

According to a sixth aspect, an embodiment provides a computer-readable storage medium, such as a non-transient computer-readable storage medium, where a computer program (or an instruction) is stored in the computer-readable storage medium, and when the computer program (or the instruction) is run on a computer, the computer is enabled to perform any method provided in the foregoing second aspect or any possible implementation of the second aspect.

According to a seventh aspect, an embodiment provides a computer program product, and when the computer program product runs on a computer, any method provided in the foregoing first aspect or any possible implementation of the first aspect is performed.

According to an eighth aspect, an embodiment provides a computer program product, and when the computer program product runs on a computer, any method provided in the foregoing second aspect or any possible implementation of the second aspect is performed.

It may be understood that any one of the apparatus for creating a network simulation platform, the network simulation apparatus, the computer storage media, or the computer program products provided above may be used in a corresponding method provided above. Therefore, for effects that can be achieved, refer to effects in the corresponding method, which are not described herein again.

DETAILED DESCRIPTION OF THE EMBODIMENTS

A network simulation platform, also referred to as a network simulation system, is software running on a server (or referred to as a simulation device), and is used to perform a network simulation task. Performing a network simulation task may be understood as performing simulation on one or more network performance indicators (such as a channel matrix, a multi-path parameter, and cell interference).

Figure 1:
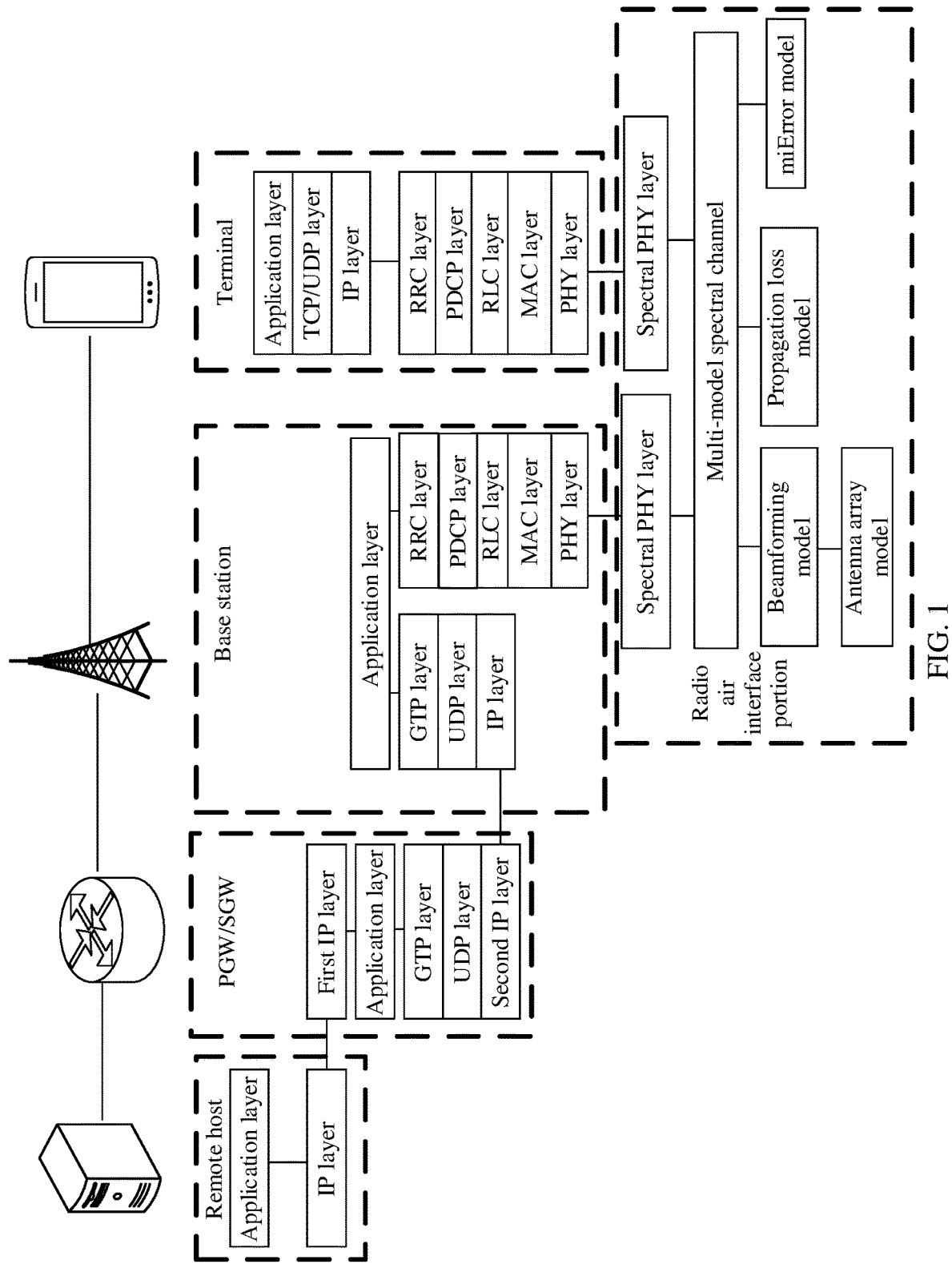
FIG. 1 is a schematic diagram of a conventional network simulation platform.

FIG. 1 shows a schematic diagram of a conventional network simulation platform. The conventional network simulation platform shown in FIG. 1 is implemented by using a system simulation technology, where a simulation process of the conventional network simulation platform includes: antenna modeling (a creation process of an antenna array model in FIG. 1), channel modeling (a creation process of a multi-model spectral channel in FIG. 1), scheduling algorithm processing (which is not shown in FIG. 1, and may be included in a MAC layer), protocol procedure processing, and the like. In a specific implementation process, a network simulation platform needs to simulate an information exchange between protocol layers, process each data packet based on a simulated protocol layer, and simulate a data packet exchange between network elements. In addition, the network simulation platform may further simulate a resource scheduling process, a baseband processing process, and the like.

FIG. 1 illustrates protocol layers that need to be simulated when network elements in a radio communications network communicate with each other, and feature information of a radio air interface portion. The network elements include: a remote host, a PDN gateway (PGW)/a serving gateway (SGW), a base station, and a terminal. PDN is an English acronym for public data network. For the remote host, protocol layers that need to be simulated include: an application layer, a Transmission Control Protocol (TCP) layer/a User Datagram Protocol (UDP) layer, and an Internet Protocol (IP) layer. For the PGW/SGW, protocol layers that need to be simulated include: a first IP layer, an application layer, a GPRS tunneling protocol (GTP) layer, a UDP layer, and a second IP layer. GPRS is an English acronym for general packet radio service. The first IP layer corresponds to the IP layer of the remote host. For the base station, protocol layers that need to be simulated include: an IP layer, a UDP layer, and a GTP layer that respectively correspond to the second IP layer, the UDP layer, and the GTP layer of the PGW/SGW, and an application layer, a radio resource control (RRC) layer, a Packet Data Convergence Protocol (PDCP) layer, a radio link control (RLC) layer, a Media Access Control (MAC) layer, and a physical layer. For the terminal, protocol layers that need to be simulated include: a PHY layer, a MAC layer, an RLC layer, a PDCP layer, and an RRC layer that respectively correspond to the PHY layer, the MAC layer, the RLC layer, the PDCP layer, and the RRC layer of the base station, and an IP layer, a TCP/UDP layer, and an application layer that respectively correspond to the IP layer, the TCP/UDP layer, and the application layer of the remote host.

"Two protocol layers correspond to each other" means that a processing process performed by one of the two protocol layers is an inverse process for a processing process performed by the other protocol layer. In addition, the feature information of the radio air interface portion further needs to be simulated between the base station and the terminal. For example, the following need to be simulated: a spectral PHY layer, a multi-model spectral channel, a beamforming model (used to simulate a beamforming technology), a propagation loss model (used to simulate an energy loss during an information transmission process), a mutual information error (mutual information error, miError) model, an antenna array model (used to simulate features of antenna arrays of the base station and the terminal), and the like.

Although the system simulation technology can implement dynamic simulation, system simulation is implemented by simulating a mechanism for exchanging messages between network protocol layers and a mechanism for exchanging messages between network elements, resulting in a large amount of calculation and low simulation efficiency. Consequently, conventional system simulation cannot be applied to large-scale networks. In addition, the system simulation technology is mainly used to simulate a single base station, and focuses on simulation of the radio air interface portion, and therefore cannot implement end-to-end simulation (that is, simulation of a cross-network network performance indicator).

Based on this, embodiments provide a method and an apparatus for creating a network simulation platform, and a network simulation method and apparatus.

Solutions provided in the embodiments may be applied to various communications systems, for example, a 5th generation (5G) mobile communications system such as a 5G New Radio (NR) system, a future evolved system, or a plurality of combined communications systems, or may be applied to an existing communications system. A server (denoted as a first server) configured to perform the method for creating a network simulation platform and a server (denoted as a second server) configured to perform the network simulation method may be a same server, or may be different servers. For example, the second server may directly or indirectly exchange information with the first server to obtain the network simulation platform created by the first server, and then perform network simulation based on the network simulation platform. In specific implementation, the servers (including the first server and the second server) may be (or be integrated in) any device deployed in an actual network, or may be a device independent of each device in an actual network.

Figure 2:
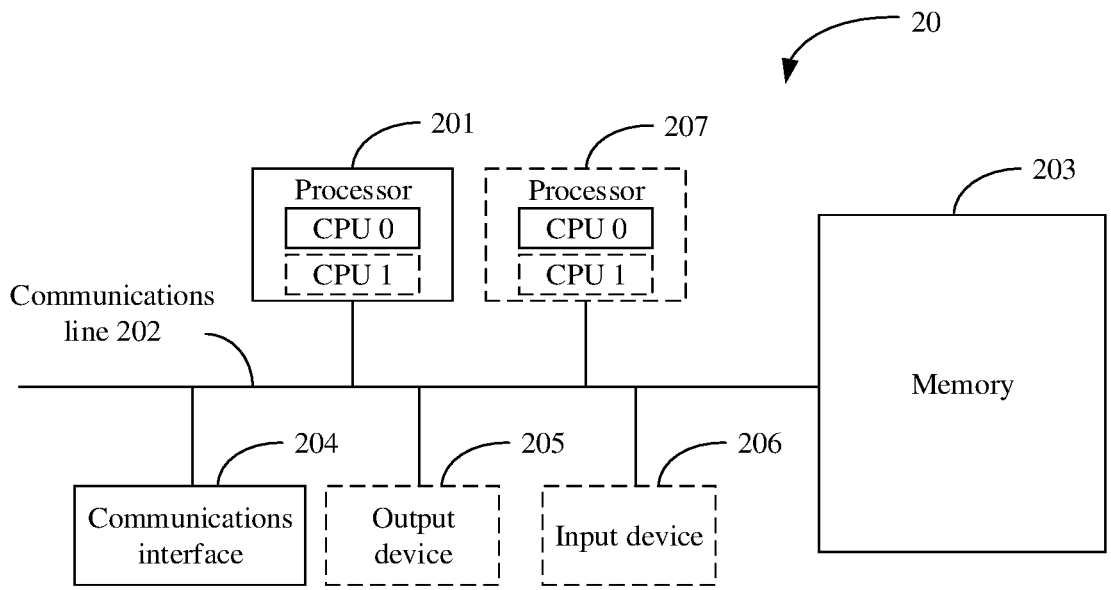
FIG. 2 is a schematic structural diagram of a server applicable to an embodiment.

FIG. 2 shows a schematic structural diagram of a server 20 (including the foregoing first server and second server) applicable to an embodiment. The server 20 is configured to perform the method for creating a network simulation platform and/or the network simulation method provided in the embodiments. The server 20 may include at least one processor 201, a communications line 202, a memory 203, and at least one communications interface 204.

The processor 201 may be a central processing unit (CPU), a microprocessor, an application-specific integrated circuit (ASIC), or one or more integrated circuits configured to control program execution in a solution.

The communications line 202 may include a path for transmitting information between the foregoing components (such as the at least one processor 201, the communications line 202, the memory 203, and the at least one communications interface 204).

The communications interface 204 is an apparatus of any transceiver type and is configured to communicate with another device or communications network such as a wide area network (WAN) or a local area network (LAN).

The memory 203 may be a read-only memory (ROM) or another type of static storage device that may store static information and instructions, or a random access memory (RAM) or another type of dynamic storage device that may store information and instructions, or may be an electrically erasable programmable read-only memory (EEPROM), a compact disc read-only memory (CD-ROM) or another compact disc storage, optical disk storage (including a compact disk, a laser disk, an optical disk, a digital versatile disk, a Blu-ray disk, or the like), or a magnetic disk storage medium or another magnetic storage device, or any another medium that may be configured to carry or store expected program code in a form of instructions or a data structure and that may be accessed by a computer. The embodiments are not limited thereto. The memory 203 may exist independently, and is connected to the processor 201 by using the communications line 202. The memory 203 may alternatively be integrated with the processor 201. The memory 203 provided in the embodiment may generally be non-volatile. The memory 203 is configured to store a computer instruction used to execute the solution, and the execution is controlled by the processor 201. The processor 201 is configured to execute the computer instruction stored in the memory 203, so as to implement methods provided in the following embodiments.

Optionally, the computer instruction in the embodiments may also be referred to as application program code, which is not limited in the embodiments.

In specific implementation, in an embodiment, the server 20 may include a plurality of processors, such as the processor 201 and a processor 207 in FIG. 2. Each of these processors may be a single-CPU processor or may be a multi-CPU processor. The processor herein may be one or more devices, circuits, and/or processing cores configured to process data (for example, a computer program instruction).

In specific implementation, in an embodiment, the server 20 may further include an output device 205 and/or an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and may receive input of a user in a plurality of manners. For example, the input device 206 may be a mouse, a keyboard, a touchscreen device, a sensing device, or the like.

The following describes terms in the embodiments for ease of understanding.

A black box model, is a model that is mostly used in environmental prediction. The black box model is created based on an input-output relationship (that is, a relationship between an input parameter and an output parameter), and reflects a general direct causal relationship between the output parameter and the input parameter. A black box model generally has one output parameter and one or more input parameters.

End-to-end simulation may also be referred to as cross-network network performance indicator simulation or cross-layer network performance indicator simulation. A cross-network (or cross-layer) network performance indicator refers to a network performance indicator that may be affected by a plurality of types of networks. The plurality of types of networks (or a plurality of layers of networks) include a core network, a bearing network, and an access network. For example, a delay may be affected by a core network and a transport network. Therefore, the delay may be considered as a cross-network network performance indicator. Further, in some implementations, the delay may also be considered as a single-network network performance indicator, such as a delay in a core network or a delay in a transport network.

In a description, "at least one" includes one or more. "A plurality of" refers to two or more than two. For example, at least one of A, B, and C includes: A exists alone, B exists alone, C exists alone, A and B coexist, A and C coexist, B and C coexist, and A, B, and C coexist. In the description, "/" represents "or", for example, A/B may represent A or B. The term "and/or" in the embodiments describes only an association relationship for describing associated objects and represents that three relationships may exist. For example, A and/or B may represent the following three cases: Only A exists, both A and B exist, and only B exists.

In the description, words such as "exemplary" or "for example" are used to represent examples, examples, or descriptions. Any embodiment, implementation, or design scheme described as an "exemplary" or "for example" in the embodiments should not be explained as being more preferred or having more advantages than another embodiment, implementation, or design scheme. Exactly, use of the word "exemplary" or "example" or the like is intended to present a relative concept in a specific manner.

The following describes the solutions provided in the embodiments with reference to the accompanying drawings. It should be noted that service scenarios described in the embodiments are intended for more clearly describing the solutions of the embodiments, and are non-limiting. A person of ordinary skill in the art knows that, with evolution of network architectures and emergence of new service scenarios, the solutions provided in the embodiments are equally applicable to similar problems.

Figure 3:
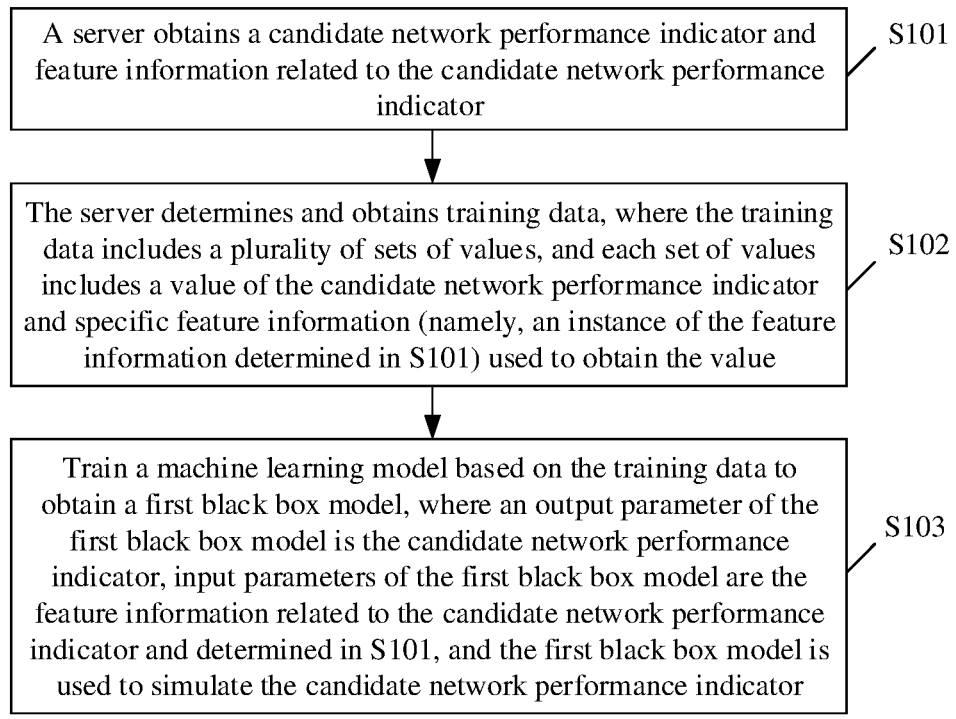
FIG. 3 is a schematic flowchart of a method for creating a network simulation platform according to an embodiment.

FIG. 3 shows a schematic flowchart of a method for creating a network simulation platform according to an embodiment. The network simulation platform includes at least one black box model. In the embodiment, the creating a network simulation platform includes creating each of the at least one black box model. In this embodiment, a description is provided by using creation of a first black box model included in the at least one black box model as an example. The first black box model may be any one of the at least one black box model. The method shown in FIG. 3 includes the following steps:

S101. A server obtains a candidate network performance indicator and feature information related to the candidate network performance indicator.

A specific implementation in which the server obtains the candidate network performance indicator and the feature information related to the candidate network performance indicator is not limited in the embodiment. For example, the server may receive the candidate network performance indicator and the feature information related to the candidate network performance indicator that are indicated by a user or sent by another device. For another example, the server may determine, based on information indicated by a user or information sent by another device, the candidate network performance indicator and the feature information related to the candidate network performance indicator.

The candidate network performance indicator may be any network performance indicator in a core network, a bearing network, or an access network, or may be a cross-network network performance indicator. The performance indicator in the core network may include at least one of the following: a user distribution feature, a user motion feature, a service feature, a delay, quality of service (QoS), a mean opinion score MOS (MOS), a jitter, a throughput, and the like. The performance indicator in the bearing network may include at least one of the following: a delay, a jitter, a throughput, and the like. The performance indicator in the access network may include at least one of the following: interference, coverage, a channel capacity, a throughput, a rank, a jitter, and the like. The cross-network network performance indicator may include a delay, a jitter, a throughput, and the like. In specific implementation, the candidate network performance indicator may be any network performance indicator that an existing network simulation technology can simulate. Further, the embodiment is not limited thereto.

Feature information related to one candidate network performance indicator refers to a part or all of feature information needed to obtain the candidate network performance indicator. The feature information related to one candidate network performance indicator may be one or more parameters. The one or more parameters may be determined based on a degree of impact on the candidate network performance indicator or the like. For example, the one or more parameters may be one or more parameters that have relatively large impact on the candidate network performance indicator.

For example, the candidate network performance indicator includes a rank, and feature information related to the rank includes a channel matrix and the like. When the rank is a rank of a terminal, the channel matrix may be a channel matrix between the terminal and a primary serving base station of the terminal.

For example, the candidate network performance indicator includes a channel matrix, and feature information related to the channel matrix includes a multi-path parameter, an antenna configuration parameter, and the like. When the channel matrix is a channel matrix between the terminal and a primary serving cell of the terminal, the multi-path parameter may be a multi-path parameter of a channel between the terminal and the primary serving cell, and the antenna configuration parameter may be an antenna configuration parameter of the terminal and an antenna configuration parameter of the primary serving base station. The multi-path parameter may include an angle, a delay spread, and/or the like. The antenna configuration parameter may include information such as a quantity and orientations of antennas included in an antenna array.

For example, the candidate network performance indicator includes a multi-path parameter, and feature information related to the multi-path parameter includes at least one of an electronic map, an engineering parameter, and a clutter. When the multi-path parameter may be a multi-path parameter of a channel between the terminal and the primary serving base station, the electronic map, the engineering parameter, and the clutter are respectively an electronic map, an engineering parameter, and a clutter that are used to represent a physical environment in which the terminal and the primary serving base station are located. In this case, simulation accuracy of the multi-path parameter can be improved.

For example, the candidate network performance indicator includes a channel state probability distribution parameter of a cell, and feature information related to the channel state probability distribution parameter of the cell includes a grid channel matrix of the cell, a channel state holding time sequence of the cell, and the like.

For example, the candidate network performance indicator includes a precoding matrix of a cell, and feature information related to the precoding matrix of the cell includes a grid channel matrix of the cell and the like.

S102. The server determines and obtains training data. The training data includes a plurality of sets of values, and each set of values includes one value of the candidate network performance indicator and specific feature information used to obtain the value. The specific feature information may be understood as an instance of the feature information determined in S101. For example, when the feature information determined in S101 includes a channel matrix, the instance of the feature information is a specific matrix. For another example, when the feature information determined in S101 includes a multi-path parameter, the instance of the feature information is a multi-path parameter of a channel between a specific terminal and a primary serving base station of the specific terminal.

For example, if the candidate network performance indicator includes a channel matrix, and feature information related to the channel matrix includes a multi-path parameter and an antenna configuration parameter, the training data may include: {multi-path parameter 1, antenna configuration parameter 1, and channel matrix 1}, {multi-path parameter 2, antenna configuration parameter 2, and channel matrix 2}, and the like. {Multi-path parameter n, antenna configuration parameter n, and channel matrix n} is a set of values in the training data, and the set of values is used to indicate that when values of input parameters are multi-path parameter n and antenna configuration parameter n, a value of an output parameter is channel matrix n, where n is a value greater than or equal to 1.

Optionally, the training data in S102 comes from an actual network or another simulation platform other than the simulation platform provided in the embodiment. The actual network refers to an actually deployed network, and the network may include network elements such as a PGW, an SGW, a base station, and a terminal. For example, the actual network may be a network actually deployed at a site (for example, an area such as a city). The another simulation platform may be any network simulation platform in the conventional technology, for example, the network simulation platform shown in FIG. 1. Alternatively, the another simulation platform may be a future network simulation platform.

S103. Train a machine learning model based on the training data to obtain a first black box model. An output parameter of the first black box model is the candidate network performance indicator, and input parameters of the first black box model are the feature information related to the candidate network performance indicator determined in S101. The first black box model is used to simulate the candidate network performance indicator.

Optionally, a type of the machine learning model may include a neural network model, such as an image-based neural network model or a convolutional neural network (CNN). In addition, the type of the machine learning model may include a statistical learning model, such as a regression model or a classification model.

S103 may include: selecting a machine learning model based on the candidate network performance indicator and the feature information related to the candidate network performance indicator. For example, when the candidate network performance indicator is a multi-path parameter, the selected machine learning model may be a deep learning model such as an image-based neural network model. For another example, when the candidate network performance indicator is a channel matrix, the selected machine learning model may be a CNN. Then, the machine learning model is trained based on the training data to obtain the first black box model. A specific implementation of training the machine learning model is not limited in the embodiment. For example, reference may be made to the conventional technology. Machine learning models used to simulate different network performance indicators may be the same or different.

It may be understood that, based on the foregoing S101 to S103, a black box model used to simulate one candidate network performance indicator may be created, and black box models used to simulate one or more candidate network performance indicators in a core network, a bearing network, and/or an access network may be separately created by using a similar method. Input parameters and an output parameter (namely, input interfaces and an output interface) are defined for each black box model. In this case, it may be considered that the network simulation platform has been created.

Figure 4:
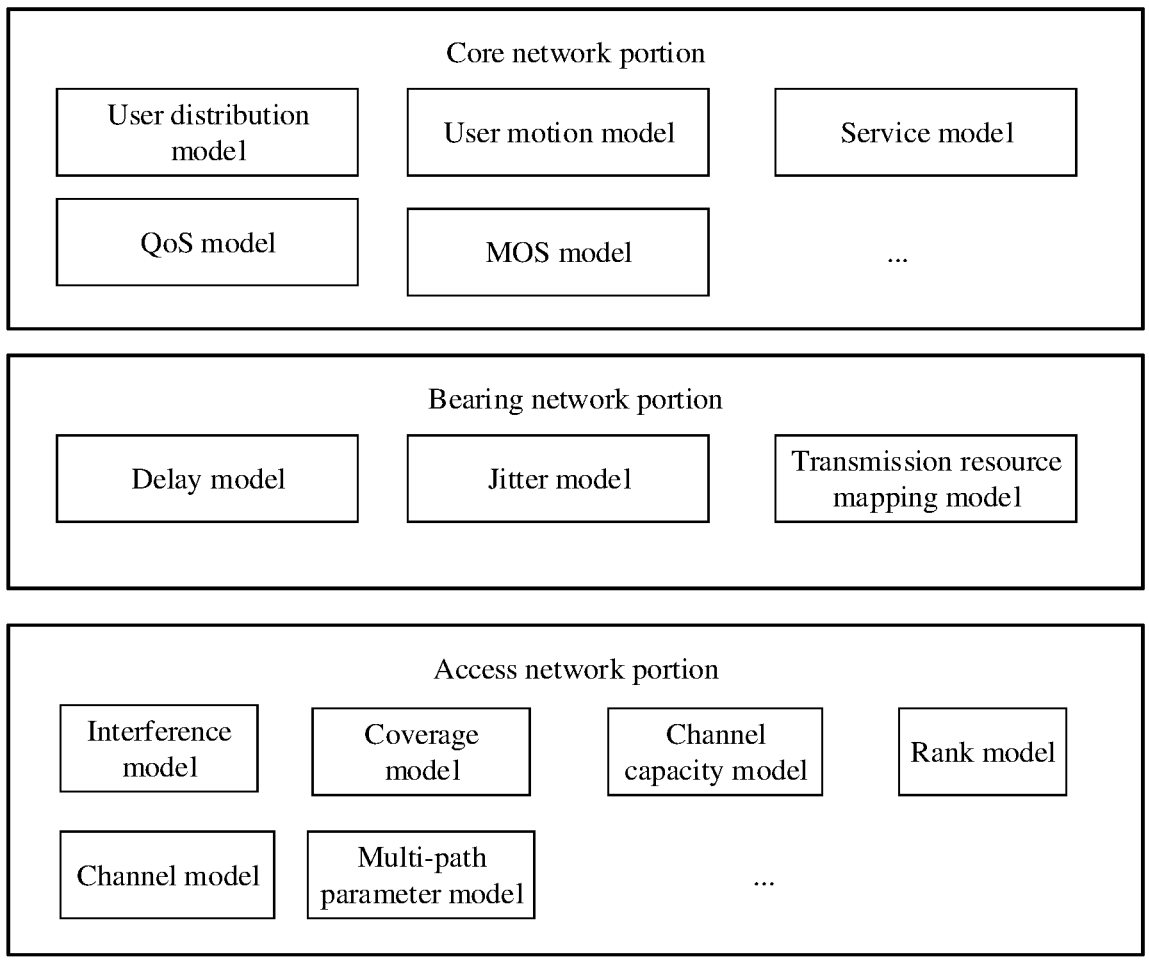
FIG. 4 is a schematic diagram of a network simulation platform according to an embodiment.

FIG. 4 shows a schematic diagram of a network simulation platform according to an embodiment. The network simulation platform shown in FIG. 4 includes: an access network portion, a bearing network portion, and a core network portion. The access network portion includes: a channel model, an interference model, a coverage model, a channel capacity model, a rank model, and the like, which are respectively used to simulate network performance indicators such as a channel matrix, interference, coverage, a channel capacity, and a rank. The bearing network portion includes: a delay model, a jitter model, a transmission resource mapping model, and the like, which are respectively used to simulate network performance indicators such as a delay, a jitter, and transmission resource mapping. The core network portion includes: a user distribution model, a user motion model, a service model, a QoS model, a MOS model, and the like, which are respectively used to simulate a user distribution feature, a user motion feature, a service feature, QoS, and a MOS. Each model in FIG. 4 may be a black box model.

In a specific implementation process, for an access network, a wireless operator concerns performance indicators such as coverage, interference, and a capacity. Based on this, the coverage, the interference, and the capacity may be used as candidate network performance indicators to perform S101 to S103, so as to create a black box model used to simulate the coverage, a black box model used to simulate the interference, and a black box model used to simulate the capacity. This process may also be referred to as a process of black box modeling on the coverage, the interference, and the capacity.

Optionally, the network simulation platform further includes a second black box model. An output parameter of the second black box model is one of the input parameters of the first black box model. If the first black box model has a plurality of input parameters, any one or more input parameters in the plurality of input parameters may be an output parameter of a black box model provided in the embodiment.

Figure 5A:
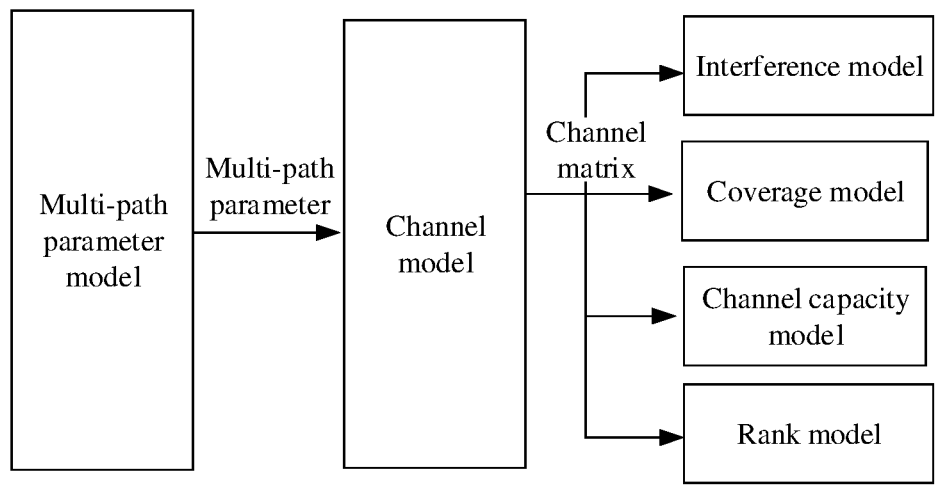
FIG. 5A is a schematic diagram of cascading between black box models according to an embodiment.

This optional solution indicates that the embodiment supports a solution in which an output parameter of one black box model is used as an input parameter of another black box model (that is, there is an association relationship between the black box models). For example, with reference to FIG. 5A, an output parameter (namely, a multi-path parameter) of a multi-path parameter model may be used as an input parameter of a channel model. An output parameter (namely, a channel matrix) of the channel model may be used as an input parameter of an interference model, a coverage model, a channel capacity model, and a rank model.

This optional solution provides a theoretical basis for "cascading a plurality of black box models during a simulation process to simulate a network performance indicator", and provides a theoretical basis for implementing end-to-end simulation.

Optionally, the output parameter of the first black box model is a network performance indicator in a first network, and the output parameter of the second black box model is a network performance indicator in a second network. The first network is a core network, a bearing network, or an access network; and the second network is any network other than the first network among the core network, the bearing network, and the access network. That is, the embodiment supports simulation of the cross-network network performance indicator, that is, supports end-to-end simulation. In other words, a model in an access network portion, a model in a bearing network portion, and a model in a core network portion may collaboratively complete simulation of a network performance indicator.

Figure 5B:
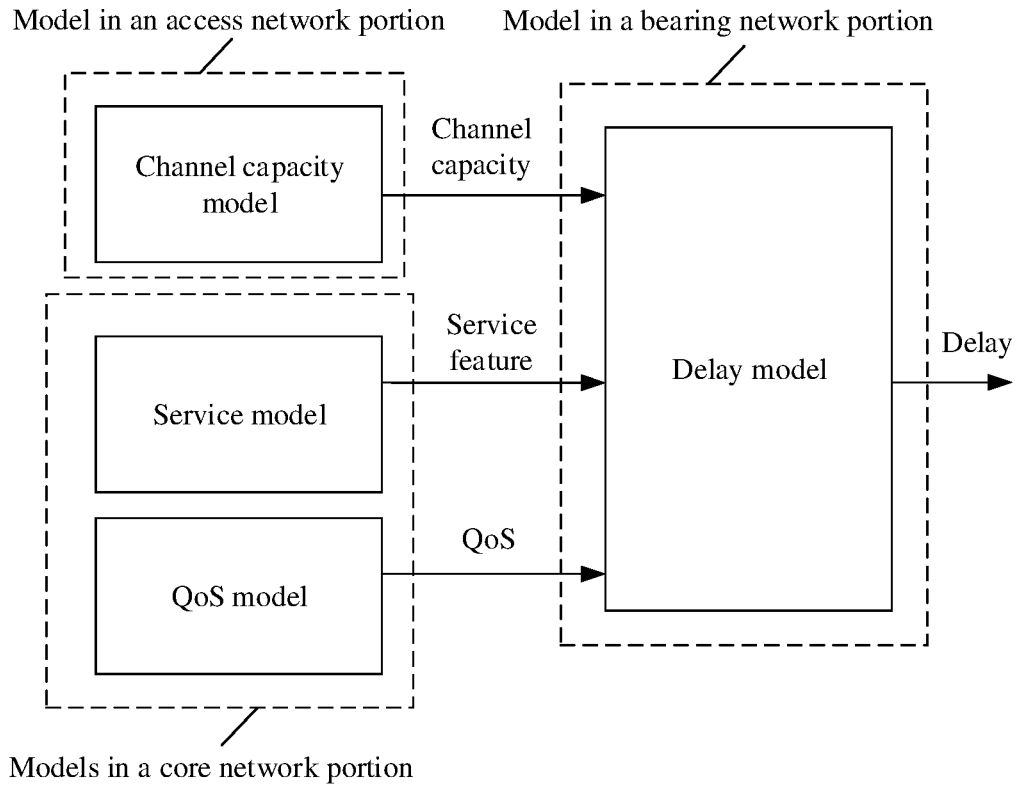
FIG. 5B is a schematic diagram of another type of cascading between black box models according to an embodiment.

For example, with reference to FIG. 5B, an output parameter (namely, a channel capacity) of a channel capacity model in an access network portion, an output parameter of a service model in the access network portion, and an output parameter (namely, a QoS demand) of a QoS model in a core network portion may be used as input parameters of a delay model in a bearing network.

The method for creating a network simulation platform provided in the embodiment mainly focuses on the candidate network performance indicator and the input feature information related to the candidate network performance indicator and does not need to simulate a protocol procedure in an actual network. Therefore, the method has relatively low complexity, and may be applied to large-scale network simulation.

The following describes the foregoing method for creating a network simulation platform by using a specific embodiment.

An objective of this embodiment is to create a black box model that can simulate a channel matrix. Based on this, the candidate network performance indicator is the channel matrix, and feature information related to the channel matrix is a multi-path parameter. A method for creating a black box model used to simulate a channel matrix according to the embodiment is as follows:

Step 1: Obtain training data. The training data includes a plurality of sets of values. Each set of values includes a channel matrix and a value of a multi-path parameter used to obtain the channel matrix.

Figure 6:
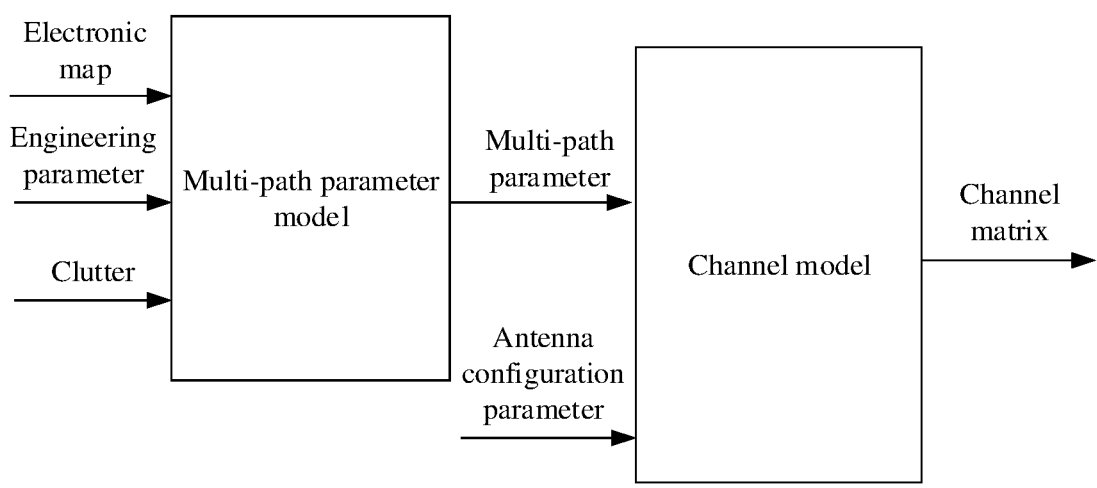
FIG. 6 is a schematic diagram of a multi-path parameter model and a channel matrix model according to an embodiment.

In some implementations, the value of the multi-path parameter may be determined based on a multi-path parameter model. The multi-path parameter model may be a multi-path parameter model provided in a conventional technology, such as a ray tracing model or a statistical model. Alternatively, the multi-path parameter model may be a black box model used to simulate a multi-path parameter provided in the embodiment. FIG. 6 shows a schematic diagram of a multi-path parameter model and a channel matrix model according to an embodiment.

In some other implementations, the value of the multi-path parameter may be estimated based on actually measured data.

Step 2: Input the obtained training data into a neural network model (such as a 3GPP protocol model), and train the neural network model to obtain the black box model used to simulate a channel matrix.

It may be understood that the multi-path parameter may be obtained from ray tracing or the actually measured data. Therefore, a process of obtaining the multi-path parameter model and a process of obtaining the channel matrix may be separately performed, and parallel training may be performed to improve training efficiency.

It should be noted that in a conventional technology, the multi-path parameter required for simulating the channel matrix is usually obtained based on a statistical model or a ray tracing model. When the multi-path parameter required for simulating the channel matrix is obtained based on a statistical model, the multi-path parameter required for the simulation is randomly generated by using the statistical model. Therefore, a channel response in an actual environment cannot be accurately reflected. Obtaining, based on the ray tracing model or the like, the multi-path parameter required for simulating the channel matrix may include: generating a large number of rays in an electronic map based on a plane wave assumption and tracing reflection behavior and scattering behavior of these rays by using algorithms to finally generate the multi-path parameter required for the simulation. This method has relatively low calculation efficiency and cannot be applied to a large-scale simulation scenario. In this embodiment, for the simulation of the multi-path parameter based on the black box model, features of a radio propagation environment may be obtained directly from the electronic map and an engineering parameter, and a corresponding multi-path parameter may be generated based on these features. In this way, the simulation is more efficient. Therefore, a black box simulation model is applicable to a large-scale simulation scenario.

In a specific implementation process, the network simulation platform provided in the embodiments may externally provide an invoking interface in a form of a library. The black box model (for example, each black box model shown in FIG. 4) in the network simulation platform may be separately invoked, or a plurality of black box models may be jointly invoked, so as to complete simulation of a network performance indicator. In addition, simulation of the cross-network network performance indicator may further be completed through direct end-to-end invoking. A user may flexibly select different invoking modes based on simulation demands (such as an indicator concerned by the user and simulation efficiency).

In a specific implementation process, at a simulation stage, the black box model may be used to replace a message queue processing process in a conventional network simulation platform. For example, a black box model may be used to replace a network element in a conventional network simulation platform, or may be used to replace a functional module (such as a channel model, a scheduling model, or a transmission model) in a network element.

Figure 7A:
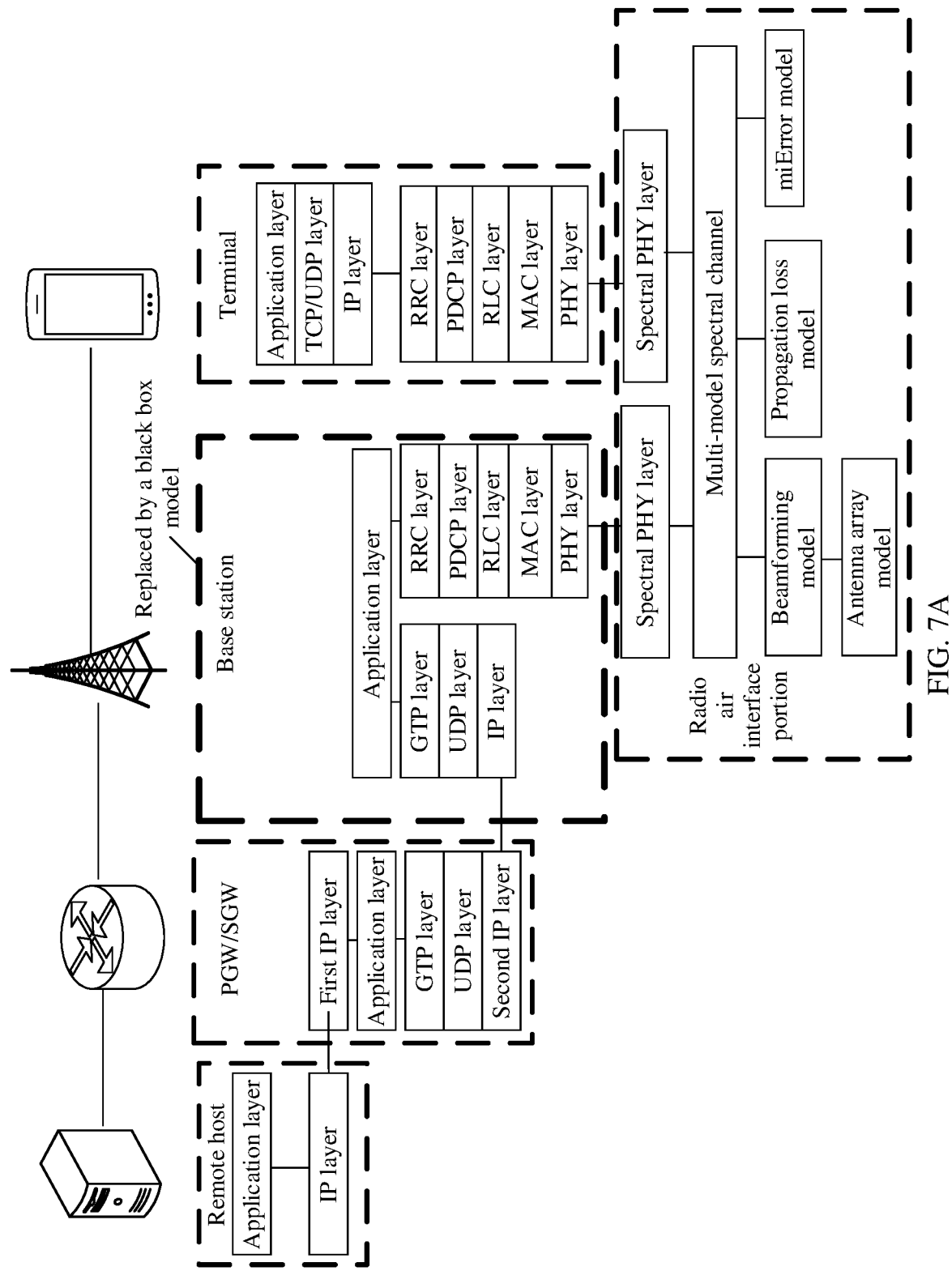
FIG. 7A is a schematic diagram of a network simulation platform applicable to an embodiment.
Figure 7B:
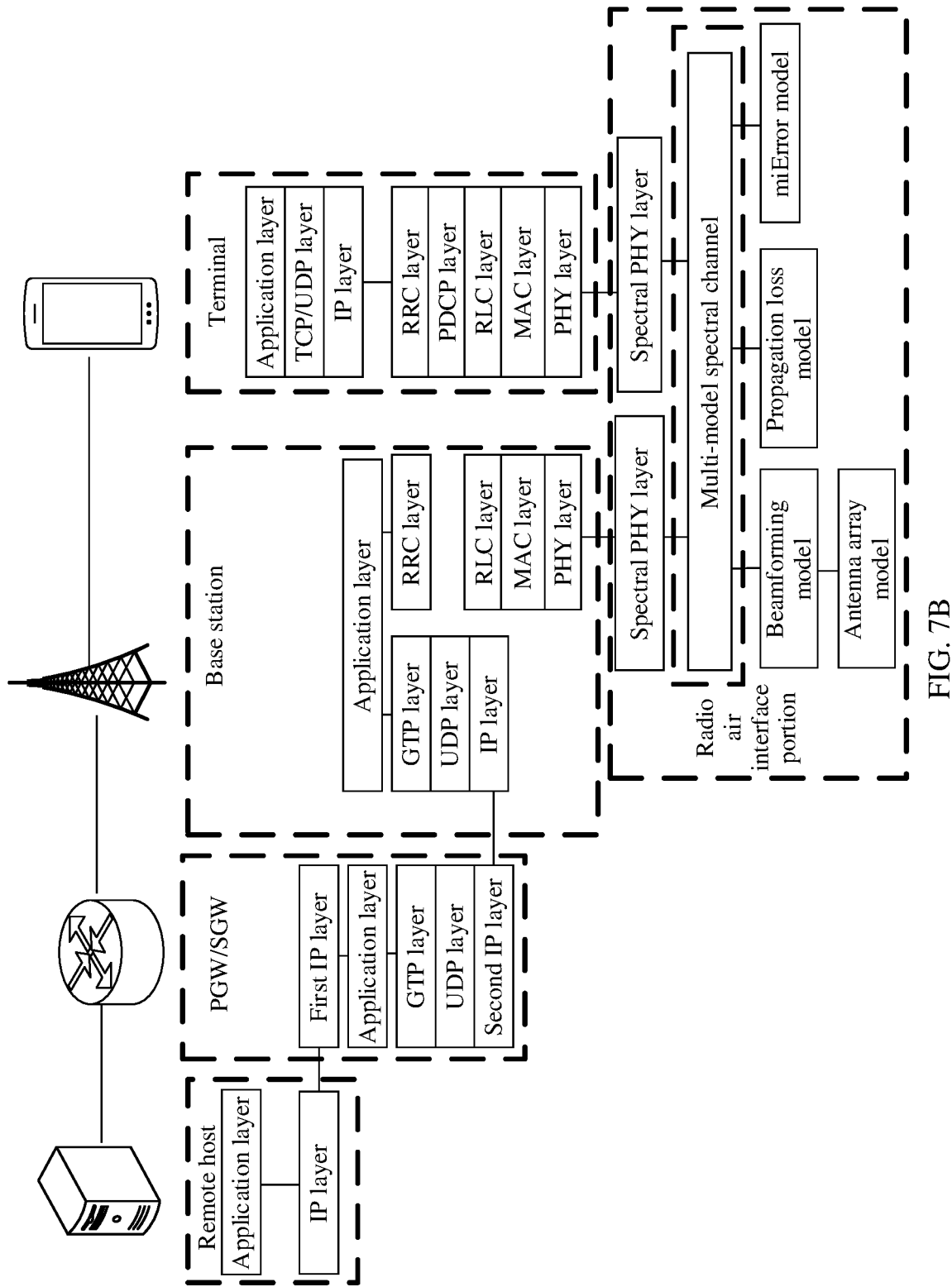
FIG. 7B is a schematic diagram of another network simulation platform applicable to an embodiment.

When a black box model is used to replace a network element in a conventional network simulation platform, an output parameter of the black box model is an output parameter of a functional module of the network element, as shown in FIG. 7A. The black box model in FIG. 7A replaces a base station. When a black box model is used to replace a functional module in a conventional network simulation platform, an input parameter of the black box model is the same as that of the functional module, and an output parameter of the black box model is the same as that of the functional module, as shown in FIG. 7B. The black box model in FIG. 7B replaces a channel model. FIG. 7A and FIG. 7B are drawn based on FIG. 1. The black box model in FIG. 7B replaces a multi-model spectral channel (which may be understood as a channel model) included in a base station.

After a black box model is used to replace a network element or a functional module in a conventional network simulation platform, data may be exchanged between the black box model and the conventional network simulation platform. That is, the black box model provided in the embodiment may be compatible with a conventional network simulation platform.

Figure 8:
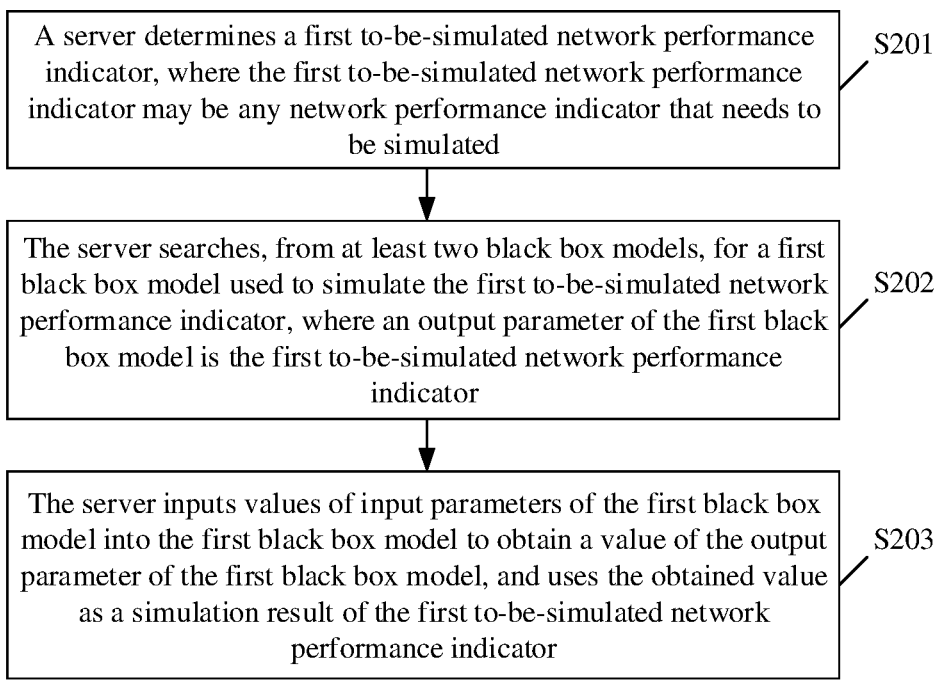
FIG. 8 is a schematic flowchart of a network simulation method according to an embodiment.

FIG. 8 shows a schematic flowchart of a network simulation method according to an embodiment. The method is applied to a network simulation platform that includes at least two black box models. Optionally, for a method for creating any black box model in the network simulation platform, refer to the foregoing description. The method shown in FIG. 8 includes the following steps.

S201. A server determines a first to-be-simulated network performance indicator. The first to-be-simulated network performance indicator may be any network performance indicator that needs to be simulated.

For example, the server may receive a network performance indicator indicated by a user (or indicated by another device), and use the network performance indicator as the first to-be-simulated network performance indicator, or analyze the network performance indicator, so as to use a network performance indicator related to the network performance indicator as the first to-be-simulated network performance indicator.

S202. The server searches, from the at least two black box models, for a first black box model used to simulate the first to-be-simulated network performance indicator. An output parameter of the first black box model is the first to-be-simulated network performance indicator.

For example, the server may select a black box model whose output parameter is the first to-be-simulated network performance indicator from the at least two black box models as the first black box model.

S203. The server inputs values of input parameters of the first black box model into the first black box model to obtain a value of the output parameter of the first black box model, and uses the obtained value as a simulation result of the first to-be-simulated network performance indicator.

For example, assuming that the first black box model is a channel model and is used to simulate a channel matrix between a terminal and a primary serving base station of the terminal, the values of the input parameters of the first black box model may include a value of an antenna configuration parameter of the terminal, a value of an antenna configuration parameter of the primary serving base station, a value of a multi-path parameter between the terminal and the primary serving base station, and the like. Based on this, the simulation result of the first to-be-simulated network performance indicator is the channel matrix between the terminal and the primary serving base station.

According to the network simulation method provided in the embodiment, a to-be-simulated network performance parameter can be directly simulated. Compared with a solution in a conventional technology in which a to-be-simulated network performance parameter is indirectly simulated by simulating a message processing procedure, the network simulation method in the embodiments helps improve simulation efficiency.

Figure 9:
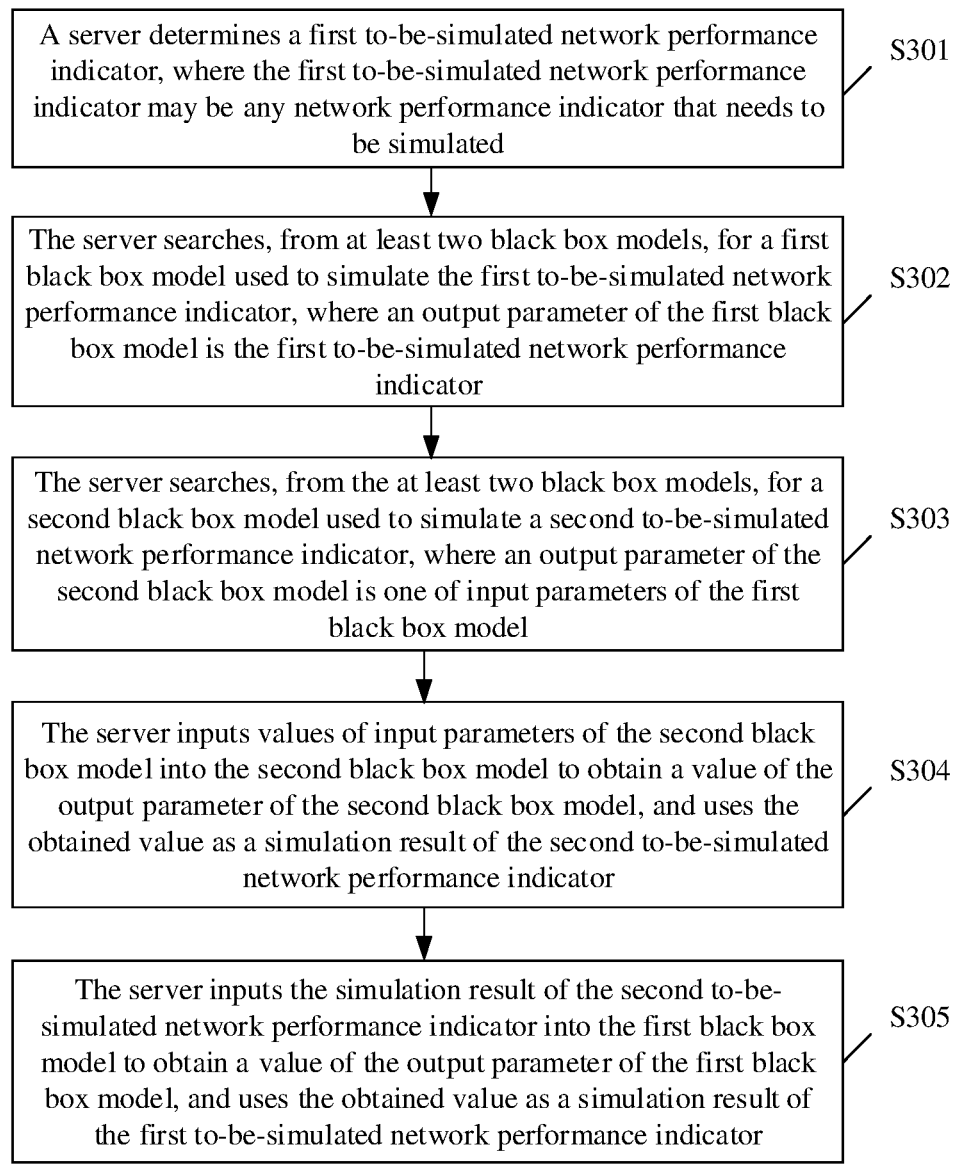
FIG. 9 is a schematic flowchart of another network simulation method according to an embodiment.

FIG. 9 shows a schematic flowchart of a network simulation method according to an embodiment. The method is applied to a network simulation platform that includes at least two black box models. The method shown in FIG. 9 includes the following steps:

For S301 and S302, refer to S201 and S202 above. Further, the embodiment is not limited thereto.

S303. The server searches, from the at least two black box models, for a second black box model used to simulate a second to-be-simulated network performance indicator, where an output parameter of the second black box is one of input parameters of the first black box model.

For example, if the server determines that one of the input parameters of the first black box model is an output parameter of one of the at least two black box models, the server uses the input parameter as the second to-be-simulated network performance indicator, and uses the black box model as the second black box model.

For example, when the first to-be-simulated network performance indicator is a channel matrix, because one of input parameters of a channel model (namely, the first black box model) is a multi-path parameter, the multi-path parameter may be used as the second to-be-simulated network performance indicator, and a multi-path parameter model may be used as the second black box model.

S304. The server inputs values of input parameters of the second black box model into the second black box model to obtain a value of the output parameter of the second black box model, and uses the obtained value as a simulation result of the second to-be-simulated network performance indicator.

For example, assuming that the second black box model is a multi-path parameter model and the first to-be-simulated network performance indicator is a channel matrix between a terminal and a primary serving base station of the terminal, the server may input an electronic map, an engineering parameter, and a clutter of a physical environment in which the terminal and the primary serving base station are located into the second black box model. Based on this, the simulation result of the second to-be-simulated network performance indicator is a multi-path parameter of a channel between the terminal and the primary serving base station.

An execution order of S302, S303 and S304 is not limited in the embodiment. For example, S302 may be performed before S303 and S304, or S303 and S304 may be performed before S302, or S302 may be performed in a process of performing S303 and S304.

S305. The server inputs the simulation result of the second to-be-simulated network performance indicator into the first black box model to obtain a value of an output parameter of the first black box model, and uses the obtained value as a simulation result of the first to-be-simulated network performance indicator.

For example, if the first black box model has another input parameter (i.e., an input parameter other than the output parameter of the second black box model), the server may further input a value of the another input parameter corresponding to the simulation result of the second to-be-simulated network performance indicator into the first black box model, so as to obtain the value of the output parameter of the first black box model. For a specific example, refer to the example in S203 above.

The foregoing mainly describes a solution provided in the embodiment from a perspective of a method. To implement the foregoing functions, a corresponding hardware structure and/or a corresponding software module configured to perform each function are/is included. A person of ordinary skill in the art should be aware that, in combination with units and algorithm steps of the examples described in the embodiments, the embodiments may be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope of the embodiments.

According to the embodiment, the server may be divided into functional modules based on the foregoing method example. For example, each functional module may be obtained through division corresponding to each function, or two or more functions may be integrated into one processing module. The integrated module may be implemented in a form of hardware, or may be implemented in a form of a software functional module. It should be noted that, in this embodiment, division into the modules is an example, and is merely logical function division. In an actual implementation, another division manner may be used.

Figure 10:
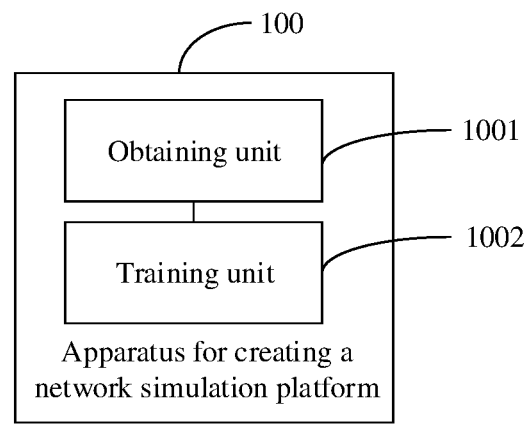
FIG. 10 is a schematic structural diagram of an apparatus for creating a network simulation platform according to an embodiment.

FIG. 10 shows a schematic structural diagram of an apparatus 100 for creating a network simulation platform according to an embodiment. As an example, the apparatus 100 may be the foregoing server configured to perform the method for creating a network simulation platform. As an example, the apparatus 100 may be configured to perform the steps performed by the server in the method shown in FIG. 3.

The network simulation platform includes at least one black box model, and the at least one black box model includes a first black box model. The apparatus 100 includes an obtaining unit 1001 and a training unit 1002. The obtaining unit 1001 is configured to obtain a candidate network performance indicator and feature information related to the candidate network performance indicator. The training unit 1002 is configured to train a machine learning model to obtain the first black box model. An output parameter of the first black box model is the candidate network performance indicator. Input parameters of the first black box model are the feature information related to the candidate network performance indicator. The first black box model is used to simulate the candidate network performance indicator. Optionally, the feature information related to the candidate network performance indicator refers to a part or all of feature information needed to obtain the candidate network performance indicator.

For example, with reference to FIG. 3, the obtaining unit 1001 may be configured to perform S101, and the training unit 1002 may be configured to perform S103.

Optionally, the candidate network performance indicator includes: a network performance indicator in a core network, a network performance indicator in a bearing network, a network performance indicator in an access network, or a cross-network network performance indicator.

Optionally, the at least one black box model further includes a second black box model. An output parameter of the second black box model is one of the input parameters of the first black box model.

Optionally, the output parameter of the first black box model is a network performance indicator in a first network, and the output parameter of the second black box model is a network performance indicator in a second network. The first network is a core network, a bearing network, or an access network. The second network is any network other than the first network among the core network, the bearing network, and the access network.

Optionally, the obtaining unit 1001 is further configured to obtain training data. The training data comes from an actual network or another simulation platform other than the simulation platform provided in the embodiment. The training unit 1002 is configured to train the machine learning model based on the training data to obtain the first black box model. For example, with reference to FIG. 3, the obtaining unit 1001 may be configured to perform S102.

Optionally, the machine learning model includes a neural network model.

Optionally, the candidate network performance indicator includes a rank, and feature information related to the rank includes a channel matrix. Optionally, the candidate network performance indicator includes a channel matrix, and feature information related to the channel matrix includes a multi-path parameter and an antenna configuration parameter. Optionally, the candidate network performance indicator includes a multi-path parameter, and feature information related to the multi-path parameter includes an electronic map, an engineering parameter, and a clutter. Optionally, the candidate network performance indicator includes a channel state probability distribution parameter of a cell, and feature information related to the channel state probability distribution parameter of the cell includes a grid channel matrix of the cell and a channel state holding time sequence of the cell. Optionally, the candidate network performance indicator includes a precoding matrix of a cell, and feature information related to the precoding matrix of the cell includes a grid channel matrix of the cell.

In an example, with reference to FIG. 2, both the obtaining unit 1001 and the training unit 1002 may be implemented by the processor 201 in FIG. 2 by invoking the computer program stored in the memory 203.

For specific descriptions of the foregoing optional manners, refer to the foregoing method embodiments, and details are not described herein again. In addition, for descriptions of any explanation and beneficial effect of the apparatus 100 provided above, refer to the foregoing corresponding method embodiments, and details are not described herein again.

It should be noted that, an action correspondingly performed by each of the foregoing units is merely a specific example. For an action actually performed by each of the units, refer to an action or a step mentioned in the foregoing description based on the embodiment described in FIG. 3.

Figure 11:
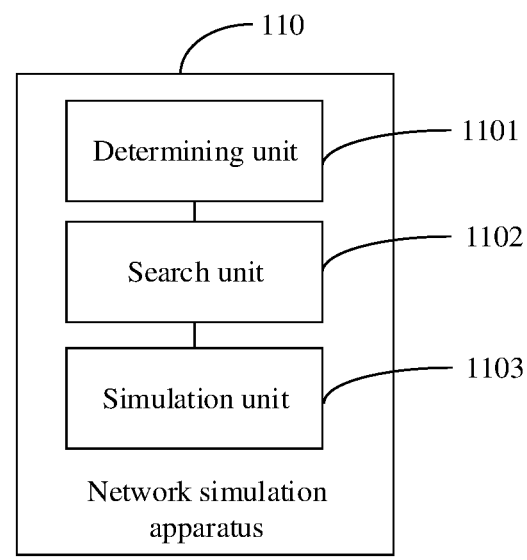
FIG. 11 is a schematic structural diagram of a network simulation apparatus according to an embodiment.

FIG. 11 shows a schematic structural diagram of a network simulation apparatus 110 according to an embodiment. The apparatus may be used in a network simulation platform that includes at least two black box models. As an example, the apparatus 110 may be the foregoing server configured to perform the network simulation method. As an example, the apparatus 110 may be configured to perform the steps performed by the server in the method shown in FIG. 8 or FIG. 9.

The apparatus 110 includes a determining unit 1101, a search unit 1102, and a simulation unit 1103. The determining unit 1101 is configured to determine a first to-be-simulated network performance indicator. The search unit 1102 is configured to search, from the at least two black box models, for a first black box model used to simulate the first to-be-simulated network performance indicator. An output parameter of the first black box model is the first to-be-simulated network performance indicator. The simulation unit 1103 is configured to: input values of input parameters of the first black box model into the first black box model to obtain a value of the output parameter of the first black box model, and use the obtained value as a simulation result of the first to-be-simulated network performance indicator. For example, with reference to FIG. 8, the determining unit 1101 may be configured to perform S201, the search unit 1102 may be configured to perform S202, and the simulation unit 1103 may be configured to perform S203. For another example, with reference to FIG. 9, the determining unit 1101 may be configured to perform S301, the search unit 1102 may be configured to perform S302, and the simulation unit 1103 may be configured to perform S304 and S305.

Optionally, the first to-be-simulated network performance indicator includes: a network performance indicator in a core network, a network performance indicator in a bearing network, a network performance indicator in an access network, or a cross-network network performance indicator.

Optionally, the search unit 1102 is further configured to search, from the at least two black box models, for a second black box model used to simulate a second to-be-simulated network performance indicator. An output parameter of the second black box model is one of the input parameters of the first black box model. The simulation unit 1103 is further configured to: input values of input parameters of the second black box model to the second black box model to obtain a value of the output parameter of the second black box model, and use the obtained value as a simulation result of the second to-be-simulated network performance indicator. When inputting the values of the input parameters of the first black box model into the first black box model, the simulation unit 1103 is configured to input the simulation result of the second to-be-simulated network performance indicator into the first black box model. For example, with reference to FIG. 9, the search unit 1102 may be configured to perform S303, and the simulation unit 1103 may be configured to perform S305.

Optionally, the output parameter of the first black box model is a network performance indicator in a first network, and the output parameter of the second black box model is a network performance indicator in a second network. The first network is a core network, a bearing network, or an access network. The second network is any network other than the first network among the core network, the bearing network, and the access network.

Optionally, the first to-be-simulated network performance indicator includes a rank, and feature information related to the rank includes a channel matrix.

Optionally, the first to-be-simulated network performance indicator includes a channel matrix, and the output parameter of the first black box model includes a multi-path parameter and an antenna configuration parameter.

Optionally, the first to-be-simulated network performance indicator includes a multi-path parameter, and the output parameter of the first black box model includes an electronic map, an engineering parameter, and a clutter.

Optionally, the first to-be-simulated network performance indicator includes a channel state probability distribution parameter of a cell, and the output parameter of the first black box model includes a grid channel matrix of the cell and a channel state holding time sequence of the cell.

Optionally, the first to-be-simulated network performance indicator includes a precoding matrix of a cell, and the output parameter of the first black box model includes a grid channel matrix of the cell.

In an example, with reference to FIG. 2, the determining unit 1101, the search unit 1102, and the simulation unit 1103 may be implemented by the processor 201 in FIG. 2 by invoking the computer program stored in the memory 203.

For specific descriptions of the foregoing optional manners, refer to the foregoing method embodiments, and details are not described herein again. In addition, for descriptions of any explanation and beneficial effect of the apparatus 110 provided above, refer to the foregoing corresponding method embodiments, and details are not described herein again.

It should be noted that an action correspondingly performed by each of the foregoing units is merely a specific example. For an action actually performed by each of the units, refer to an action or a step mentioned in the foregoing description based on the embodiment described in FIG. 8 or FIG. 9.

It should be noted that the processor described above may be implemented by using hardware or software. When implemented by using hardware, the processor may be a logical circuit, an integrated circuit, or the like. When implemented by using software, the processor may be a general-purpose processor, and is implemented by reading software code stored in the memory. The memory may be integrated into the processor, or may be located outside the processor and independently exists.

An embodiment further provides a chip. The chip integrates a circuit and one or more interfaces that are configured to implement a function of the foregoing processor. Optionally, a function supported by the chip may include the processing actions in the embodiment described in FIG. 3, FIG. 8, or FIG. 9, and details are not described herein again.

Persons of ordinary skill in the art may understand that all or some of the steps of the foregoing embodiments may be implemented by a program instructing related hardware. The foregoing program may be stored in a computer readable storage medium. The foregoing storage medium may be a read-only memory, a random access memory, or the like. The processing unit or the processor may be a central processing unit, a general-purpose processor, an application-specific integrated circuit (ASIC), a microprocessor (DSP), a field programmable gate array (FPGA) or another programmable logic device, a transistor logic device, a hardware component, or any combination thereof.

An embodiment further provides a computer program product that includes instructions. When the instructions are run on a computer, the computer is enabled to perform any of the methods in the foregoing embodiments. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (, DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that all the foregoing components provided in the embodiments and configured to store the computer instruction or the computer program, such as, but not limited to the memory, the computer-readable storage medium, and a communications chip, are non-transitory.

In the process of implementing the claimed application, a person of ordinary skill in the art may understand and implement other variations in the embodiments by referring to the accompanying drawings and descriptions.

Although the embodiments are described with reference to specific features, various modifications and combinations may be made to them without departing from the scope of the embodiments. Correspondingly, the embodiments and accompanying drawings are merely examples.

What is claimed is:

1. A method for creating a network simulation platform, wherein the network simulation platform comprises at least one black box model, and the at least one black box model comprises a first black box model, the method comprising:
    obtaining a candidate network performance indicator and feature information related to the candidate network performance indicator, wherein the feature information related to the candidate network performance indicator refers to a part or all of feature information needed to obtain the candidate network performance indicator; and
    training a machine learning model to obtain the first black box model, wherein an output parameter of the first black box model is the candidate network performance indicator, input parameters of the first black box model are the feature information related to the candidate network performance indicator, and the first black box model is used to simulate the candidate network performance indicator.

2. The method according to claim 1, wherein the candidate network performance indicator comprises: a network performance indicator in a core network, a network performance indicator in a bearing network, a network performance indicator in an access network, or a cross-network network performance indicator.

3. The method according to claim 1, wherein the at least one black box model further comprises a second black box model, and an output parameter of the second black box model is one of the input parameters of the first black box model.

4. The method according to claim 3, wherein the output parameter of the first black box model is a network performance indicator in a first network, and the output parameter of the second black box model is a network performance indicator in a second network; wherein
    the first network is a core network, a bearing network, or an access network; and the second network is any network other than the first network among the core network, the bearing network, and the access network.

5. The method according to claim 1, further comprising:
    obtaining training data, wherein the training data comes from an actual network or another simulation platform other than the simulation platform; and
    the training of the machine learning model to obtain the first black box model comprises:
    training the machine learning model based on the training data to obtain the first black box model.

6. The method according to claim 1, wherein the machine learning model comprises a neural network model.

7. The method according to claim 1, wherein
    the candidate network performance indicator comprises a rank, and feature information related to the rank comprises a channel matrix; or
    the candidate network performance indicator comprises a channel matrix, and feature information related to the channel matrix comprises a multi-path parameter and an antenna configuration parameter; or
    the candidate network performance indicator comprises a multi-path parameter, and feature information related to the multi-path parameter comprises an electronic map, an engineering parameter, and a clutter type; or
    the candidate network performance indicator comprises a channel state probability distribution parameter of a cell, and feature information related to the channel state probability distribution parameter of the cell comprises a grid channel matrix of the cell and a channel state holding time sequence of the cell; or
    the candidate network performance indicator comprises a precoding matrix of a cell, and feature information related to the precoding matrix of the cell comprises a grid channel matrix of the cell.

8. A network simulation method, wherein the method is applied to a network simulation platform that comprises at least two black box models, the method comprising:
    determining a first to-be-simulated network performance indicator;
    searching, from the at least two black box models, for a first black box model used to simulate the first to-be-simulated network performance indicator, wherein an output parameter of the first black model is the first to-be-simulated network performance indicator; and inputting values of input parameters of the first black box model into the first black box model to obtain a value of the output parameter of the first black box model, and using the obtained value as a simulation result of the first to-be-simulated network performance indicator.

9. The method according to claim 8, wherein the first to-be-simulated network performance indicator comprises: a network performance indicator in a core network, a network performance indicator in a bearing network, a network performance indicator in an access network, or a cross-network network performance indicator.

10. The method according to claim 8, further comprising:
searching, from the at least two black box models, for a second black box model used to simulate a second to-be-simulated network performance indicator, wherein an output parameter of the second black box model is one of the input parameters of the first black box model; and
inputting values of input parameters of the second black box model into the second black box model to obtain a value of the output parameter of the second black box model, and using the obtained value as a simulation result of the second to-be-simulated network performance indicator; and
the inputting values of the input parameters of the first black box model into the first black box model comprises:
inputting the simulation result of the second to-be-simulated network performance indicator into the first black box model.

11. The method according to claim 10, wherein the output parameter of the first black box model is a network performance indicator in a first network, and the output parameter of the second black box model is a network performance indicator in a second network; wherein
the first network is a core network, a bearing network, or an access network; and the second network is any network other than the first network among the core network, the bearing network, and the access network.

12. The method according to claim 8, wherein
the first to-be-simulated network performance indicator comprises a rank, and feature information related to the rank comprises a channel matrix; or
the first to-be-simulated network performance indicator comprises a channel matrix, and the output parameter of the first black box model comprises a multi-path parameter and an antenna configuration parameter; or
the first to-be-simulated network performance indicator comprises a multi-path parameter, and the output parameter of the first black box model comprises an electronic map, an engineering parameter, and a clutter type; or
the first to-be-simulated network performance indicator comprises a channel state probability distribution parameter of a cell, and the output parameter of the first black box model comprises a grid channel matrix of the cell and a channel state holding time sequence of the cell; or
the first to-be-simulated network performance indicator comprises a precoding matrix of a cell, and the output parameter of the first black box model comprises a grid channel matrix of the cell.

13. A network simulation system, comprising an apparatus for creating a network simulation platform and a network simulation apparatus, wherein the network simulation platform comprises at least one black box model, and the at least one black box model comprises a first black box model, and
the apparatus for creating a network simulation platform comprises at least one first processor and a first memory, wherein the first memory is configured to store a first program, and wherein the first program, when executed by the at least one first processor, causes the apparatus for creating a network simulation platform to:
obtain a candidate network performance indicator and feature information related to the candidate network performance indicator, wherein the feature information related to the candidate network performance indicator refers to a part or all of feature information needed to obtain the candidate network performance indicator; and
train a machine learning model to obtain the first black box model, wherein an output parameter of the first black box model is the candidate network performance indicator, input parameters of the first black box model are the feature information related to the candidate network performance indicator, and the first black box model is used to simulate the candidate network performance indicator;
and the network simulation apparatus comprises at least one second processor and a second memory, wherein the second memory is configured to store a program, and wherein the second program, when executed by the at least one second processor, causes the network simulation apparatus to:
determine a first to-be-simulated network performance indicator;
search, from the at least two black box models, for a first black box model used to simulate the first to-be-simulated network performance indicator, wherein an output parameter of the first black model is the first to-be-simulated network performance indicator; and
input values of input parameters of the first black box model into the first black box model to obtain a value of the output parameter of the first black box model, and using the obtained value as a simulation result of the first to-be-simulated network performance indicator.

14. The network simulation system according to claim 13, wherein the candidate network performance indicator comprises: a network performance indicator in a core network, a network performance indicator in a bearing network, a network performance indicator in an access network, or a cross-network network performance indicator.

15. The network simulation system according to claim 13, wherein the at least one black box model further comprises a second black box model, and an output parameter of the second black box model is one of the input parameters of the first black box model.

16. The network simulation system according to claim 13, wherein the first program, when executed by the at least one first processor, further causes the apparatus for creating a network simulation platform to:
obtain training data, wherein the training data comes from an actual network or another simulation platform other than the simulation platform; and
train the machine learning model based on the training data to obtain the first black box model.

17. The network simulation system according to claim 13, wherein the machine learning model comprises a neural network model.

18. The network simulation system according to claim 13, wherein the second program, when executed by the at least one second processor, further causes the network simulation apparatus to:
- search, from the at least two black box models, for a second black box model used to simulate a second to-be-simulated network performance indicator, wherein an output parameter of the second black box model is one of the input parameters of the first black box model; and
- input values of input parameters of the second black box model into the second black box model to obtain a value of the output parameter of the second black box model, and use the obtained value as a simulation result of the second to-be-simulated network performance indicator; and
- input the simulation result of the second to-be-simulated network performance indicator into the first black box model.

19. The network simulation system according to claim 13, wherein the output parameter of the first black box model is a network performance indicator in a first network, and the output parameter of the second black box model is a network performance indicator in a second network; wherein
- the first network is a core network, a bearing network, or an access network; and the second network is any network other than the first network among the core network, the bearing network, and the access network.

20. The network simulation system according to claim 13, wherein
- the first to-be-simulated network performance indicator comprises a rank, and feature information related to the rank comprises a channel matrix; or
- the first to-be-simulated network performance indicator comprises a channel matrix, and the output parameter of the first black box model comprises a multi-path parameter and an antenna configuration parameter; or
- the first to-be-simulated network performance indicator comprises a multi-path parameter, and the output parameter of the first black box model comprises an electronic map, an engineering parameter, and a clutter type; or
- the first to-be-simulated network performance indicator comprises a channel state probability distribution parameter of a cell, and the output parameter of the first black box model comprises a grid channel matrix of the cell and a channel state holding time sequence of the cell; or
- the first to-be-simulated network performance indicator comprises a precoding matrix of a cell, and the output parameter of the first black box model comprises a grid channel matrix of the cell.

\* \* \* \* \*